(12) United States Patent
Kadotani et al.

(10) Patent No.: US 9,010,941 B2
(45) Date of Patent: Apr. 21, 2015

(54) PROJECTOR HAVING A TURBULENT FLOW PLATE DISPOSED BETWEEN A LIGHT MODULATOR AND A POLARIZER

(71) Applicant: Seiko Epson Corporation, Tokyo (JP)

(72) Inventors: Norikazu Kadotani, Matsumoto (JP); Akira Hashimoto, Shiojiri (JP); Akira Egawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 172 days.

(21) Appl. No.: 13/692,588

(22) Filed: Dec. 3, 2012

(65) Prior Publication Data

US 2013/0148086 A1    Jun. 13, 2013

(30) Foreign Application Priority Data

Dec. 7, 2011    (JP) ................................. 2011-267927

(51) Int. Cl.
*G03B 21/16*    (2006.01)
*H04N 9/31*    (2006.01)

(52) U.S. Cl.
CPC .............. *G03B 21/16* (2013.01); *H04N 9/3144* (2013.01)

(58) Field of Classification Search
CPC ........ G03B 21/14; G03B 21/16; G02B 27/14; G02B 27/12; H04N 9/3144; H04N 9/3197; G02F 1/133385; G02F 1/133603

USPC .............. 353/61, 54, 60, 81, 20, 98; 361/676, 361/679.3, 679.34, 679.59, 697; 349/5, 349/7–9, 15, 58, 80, 96
See application file for complete search history.

(56) References Cited

U.S. PATENT DOCUMENTS

| | | | | |
|---|---|---|---|---|
| 5,951,136 A * | 9/1999 | Furuhata et al. | ................. | 353/31 |
| 7,854,517 B2 * | 12/2010 | Tsubura | ......................... | 353/52 |
| 8,736,788 B2 * | 5/2014 | Kim et al. | ......................... | 349/67 |
| 2001/0040669 A1 * | 11/2001 | Aoto et al. | ...................... | 353/20 |
| 2006/0209266 A1 * | 9/2006 | Utsunomiya | ................... | 353/54 |
| 2011/0025985 A1 * | 2/2011 | Karasawa | ....................... | 353/54 |

FOREIGN PATENT DOCUMENTS

JP        2003-66534 A        3/2003

* cited by examiner

*Primary Examiner* — Sultan Chowdhury
(74) *Attorney, Agent, or Firm* — ALG Intellectual Property, LLC (57) ABSTRACT

A projector includes a light source unit, a light modulator that modulates light exited from the light source unit, a polarizer or a wave plate provided on a light incident side of the light modulator, a cooling unit that supplies cooling air to the light incident side of the light modulator, and a turbulent flow plate disposed between the light modulator and the polarizer or the wave plate in a path along which the cooling air from the cooling unit flows toward a light incident surface of the light modulator, the turbulent flow plate having a fin that tapers from a base end toward a tip.

11 Claims, 6 Drawing Sheets

PROJECTOR HAVING A TURBULENT FLOW PLATE DISPOSED BETWEEN A LIGHT MODULATOR AND A POLARIZER

BACKGROUND

1. Technical Field

The present invention relates to a projector.

2. Related Art

In the field of a projector that modulates a light flux emitted from a light source in accordance with image information and projects the resultant light flux, there is a known technology for cooling an object to be cooled, such as a liquid crystal light valve, by providing thin wires in the space between the object to be cooled and a cooling air blowoff port and blowing air to produce a turbulent flow (see JP-A-2003-66534, for example).

In the related art disclosed in JP-A-2003-66534, however, when the space between the liquid crystal light valve and a polarizer is narrowed, the produced turbulent flow becomes a laminar flow because vortices of the turbulent flow that enter the narrowed space dissipate, disadvantageously resulting in poor cooling effect. To enhance the cooling effect, it is conceivable to increase the output of a cooling unit. In this case, however, noise produced when the cooling unit is driven is problematic. It is alternatively conceivable to enhance the cooling effect by forming the liquid crystal light valve with a material having high heat conductivity. In this case, however, an increase in cost is problematic.

SUMMARY

An advantage of some aspects of the invention is to provide a projector capable of efficiently cooling a light valve while lowering the magnitude of noise and reducing the cost.

A projector according to an aspect of the invention includes a turbulent flow plate disposed between a light modulator and a polarizer or a wave plate and having a fin that tapers from a base end toward a tip. The turbulent flow plate can produce a turbulent flow in cooling air supplied to a light incident surface of the light modulator and supply the cooling air with its turbulent state maintained to the light incident surface, whereby the light modulator can be efficiently cooled. Since the cooling efficiency is thus improved, degradation of the light modulator due to heat can be prevented, and the output of the cooling unit can be so lowered that noise produced by the cooling unit is reduced. Further, since the cooling efficiency is high, each member can be made of a material selected from a wide range of candidates, which reduces the cost.

The tip of the fin may be set apart from the light incident surface of the light modulator, whereby the tip of the fin causes the cooling air containing a turbulent flow accompanied by vortices to impinge on the light modulator, whereby the light incident surface can be efficiently cooled.

Part of a light blocking plate may form the turbulent flow plate, whereby the number of parts that form the projector can be reduced, whereby the manufacturing cost can be lowered.

The fin may be disposed at a plurality of locations along a direction perpendicular to the direction in which the cooling air flows, whereby the entire light incident surface of the light modulator can be efficiently cooled.

The tips of the fins may be oriented to the windward of the cooling air, whereby the vortices of the produced turbulent flow can be enlarged, whereby the cooling efficiency can be improved.

Light incident from the light source unit may be absorbed such that light reflected off the surfaces of the fins will not therefore be incident on the light incident surface at a predetermined angle or greater, whereby light leakage that causes malfunction of a drive device that drives the light modulator, for example, will not occur.

The turbulent flow plate may block unwanted light incident on the light modulator. As a result, the cooling efficiency can be improved.

Light reflected off the light incident surface of the light modulator may be absorbed such that light reflected off the light incident surface will not therefore be reflected again or, for example, incident on the drive device that drives the light modulator, whereby light leakage that causes malfunction of the drive device will not occur.

The tips of the fins may be disposed such that they block light in a margin area, whereby the light in the margin area will not be incident on an area around the light incident surface, and therefore an increase in temperature of the light modulator can be suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described below with reference to the drawings. Each of the embodiments shows an aspect of the invention and is not intended to limit the scope of the invention but can be arbitrarily changed within the range of the technical spirit of the invention. Further, in the following drawings, the scales, the numbers, and other parameters differ from those in an actual structure in order to show each component in a readily understandable manner.

First Embodiment

Figure 1:
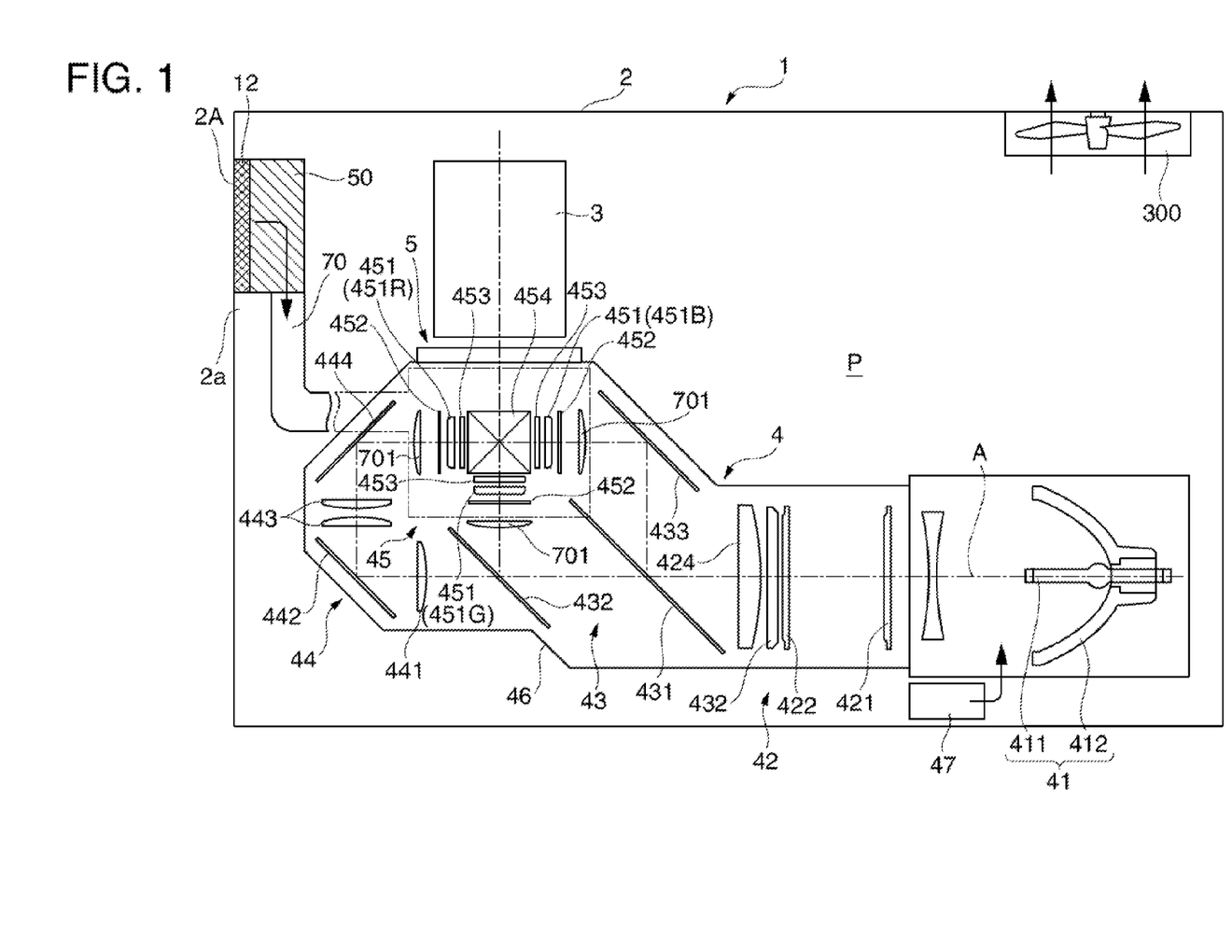
FIG. 1 shows a schematic configuration of a projector according to a first embodiment.

FIG. 1 is a diagrammatic view showing a schematic configuration of a projector 1 according to a first embodiment of the invention.

The projector 1 modulates light emitted from a light source in accordance with image information to form a color image (image light) and enlarges and projects the color image on a screen or any other projection surface (not shown). The projector 1 includes an exterior housing 2 having a substantially box-like shape, a projection lens 3, an optical unit 4, a cooling unit 5, and an exhaust fan 300 that exhausts air in an interior space P to the atmosphere, as shown in FIG. 1.

In FIG. 1, although not specifically shown, the exterior housing 2 accommodates a power supply unit that supplies components in the projector 1 with electric power, and a controller that controls the components in the projector 1.

The projection lens 3 is formed of a combination of a plurality of lenses and enlarges and projects a color image formed by the optical unit 4.

The optical unit 4 optically processes the light emitted from the light source to form a color image according to image information under the control of the controller described above. The optical unit 4 includes a light source unit 41, an illumination optical unit 42, a color separation optical unit 43, a relay optical unit 44, an image formation system 45, and an optical part enclosure 46 in which the optical parts described above are disposed in predetermined positions with respect to an illumination optical axis A set in the optical part enclosure 46.

The light source unit 41 includes a light source lamp 411 that emits light fluxes and a reflector 412 that aligns the light fluxes emitted from the light source lamp 411 in a single exiting direction. The light fluxes aligned by the reflector 412 in the single exiting direction are directed toward the illumination optical unit 42. A lamp cooling fan 47 for cooling the light source lamp 411, which generates heat, is disposed in the vicinity of the light source unit 41.

The illumination optical unit 42 includes a first lens array 421, a second lens array 422, a polarization conversion element 423, and a superimposing lens 424. The light exited from the light source unit 41 is divided by the first lens array 421 into a plurality of sub-light fluxes, which are focused in the vicinity of the second lens array 422. The sub-light fluxes exited from the second lens array 422 are incident on the polarization conversion element 423 with the central axes (principal rays) of the sub-light fluxes perpendicular to a light incident surface of the polarization conversion element 423 and converted by the polarization conversion element 423 into linearly polarized light fluxes of substantially one type that exit from the polarization conversion element 423. The plurality of sub-light fluxes exited from the polarization conversion element 423 as linearly polarized light fluxes and passed through the superimposing lens 424 are superimposed in the vicinity of three liquid crystal light valves (light modulators) 451, which will be described later, in the image formation system 45, which is an object to be cooled.

The color separation optical unit 43 includes two dichroic mirrors 431 and 432 and a reflection mirror 433 and has a function of separating the plurality of sub-light fluxes exited from the illumination optical unit 42 into red, green, and blue three color light fluxes.

The relay optical unit 44 includes a light incident-side lens 441, relay lenses 443, and reflection mirrors 442 and 444 and has a function of guiding one of the color light fluxes separated by the color separation optical unit 43, the red light, for example, to a liquid crystal light valve 451R, which will be described later, located on the side where the red light travels in the image formation system 45.

The image formation system 45 modulates light fluxes incident thereon in accordance with image information to form a color image. The image formation system 45 includes the three liquid crystal light valves 451 (reference character 451R denotes liquid crystal light valve for red light, reference character 451G denotes liquid crystal light valve for green light, and reference character 451B denotes liquid crystal light valve for blue light), a light incident-side polarizer 452 disposed in a position on the optical path upstream of each of the liquid crystal light valves 451, a light exiting-side polarizer 453 disposed in a position on the optical path downstream of each of the liquid crystal light valves 451, and a cross dichroic prism 454.

Each of the light incident-side polarizers 452 transmits only light fluxes polarized in substantially the same direction as those of the polarized light fluxes aligned by the polarization conversion element 423 and absorbs the remaining light fluxes. Each of the light incident-side polarizers 452 is formed by laminating a polarizing film on a light-transmissive substrate. Each of the liquid crystal light valves 451, in which the orientation of the liquid crystal material is controlled by a drive signal from the controller described above, modulates the polarization direction of light exited from the corresponding light incident-side polarizer 452. Each of the light exiting-side polarizers 453, which have substantially the same function as that of the light incident-side polarizers 452, receives the light fluxes modulated by the corresponding liquid crystal light valve 451, transmits light fluxes polarized in a certain direction, and absorbs the remaining light fluxes.

The blue light from the color separation optical unit 43 is supplied to the liquid crystal light valve 451B. The blue light reflected off the dichroic mirror 431 is reflected off the reflection mirror 433 and incident on the liquid crystal light valve 451B via a field lens 701 and the corresponding light incident-side polarizer 452.

The green light from the color separation optical unit 43 is supplied to the liquid crystal light valve 451G. The green light reflected off the dichroic mirror 432 is incident on the liquid crystal light valve 451G via a field lens 701 and the corresponding light incident-side polarizer 452.

The red light from the color separation optical unit 43 is supplied to the liquid crystal light valve 451R. The red light passed through the dichroic mirror 432 is incident on the liquid crystal light valve 451R via the relay optical unit 44 (light incident-side lens 441, relay lenses 443, and reflection mirrors 442 and 444), a field lens 701, and the corresponding light incident-side polarizer 452.

The cross dichroic prism 454 combines the color light fluxes exited from the light exiting-side polarizers 453 to form a color image. The cross dichroic prism 454 is formed by bonding four rectangular prisms and thus has a substantially square shape when viewed from above. Two dielectric multilayer films are formed along the interfaces between the bonded rectangular prisms. The dielectric multilayer films transmit the color light flux exited from the liquid crystal light valve 451G and passed through the corresponding light exiting-side polarizer 453 and reflect the color light fluxes exited from the liquid crystal light valves 451R and 451B and passed through the corresponding light exiting-side polarizers 453. The color light fluxes are thus combined into a color image. The color image formed by the cross dichroic prism 454 is then enlarged and projected by the projection lens 3 described above.

In the projector 1, the light fluxes exited from the light source unit 41 generate heat, for example, in the polarization conversion element 423 and the image formation system 45 (liquid crystal light valves 451, light incident-side polarizers 452, and light exiting-side polarizers 453). In particular, when the heat generated in the liquid crystal light valves 451 increases the temperatures thereof, the liquid crystal material malfunctions and the light valves are degraded, disadvantageously resulting in incorrect light modulation and hence poor color image display. To address the problem described above, in the projector 1 according to the present embodiment, the cooling unit 5 cools the image formation system 45 in such a way that the liquid crystal light valves 451 are maintained at a fixed temperature or lower.

The cooling unit 5 includes the following components: an intake fan (cooling fan) 50 that is connected to an intake port 2A formed through a sidewall 2a of the exterior housing 2, sucks outside air into the exterior housing 2, and discharges the air out of the exterior housing 2; a duct 70 that allows the air sucked by the intake fan 50 to flow as cooling air to the liquid crystal light valves 451; and a filter 12. The duct 70 has one end connected to the intake fan 50 and the other end disposed at a side end of each of the liquid crystal light valves 451. The thus configured duct 70 allows the air outside the projector 1 to flow to and cool the liquid crystal light valves 451. The filter 12 is fit in the intake port 2A and prevents dust and dirt from being sucked along with the outside air and flowing through the intake duct 70.

After the cooling air cools the liquid crystal light valves 451 and is heated thereby, the resultant high-temperature air is exhausted into the interior space P in the exterior housing 2 and then out of the projector 1 through the exhaust fan 300.

Figure 2:
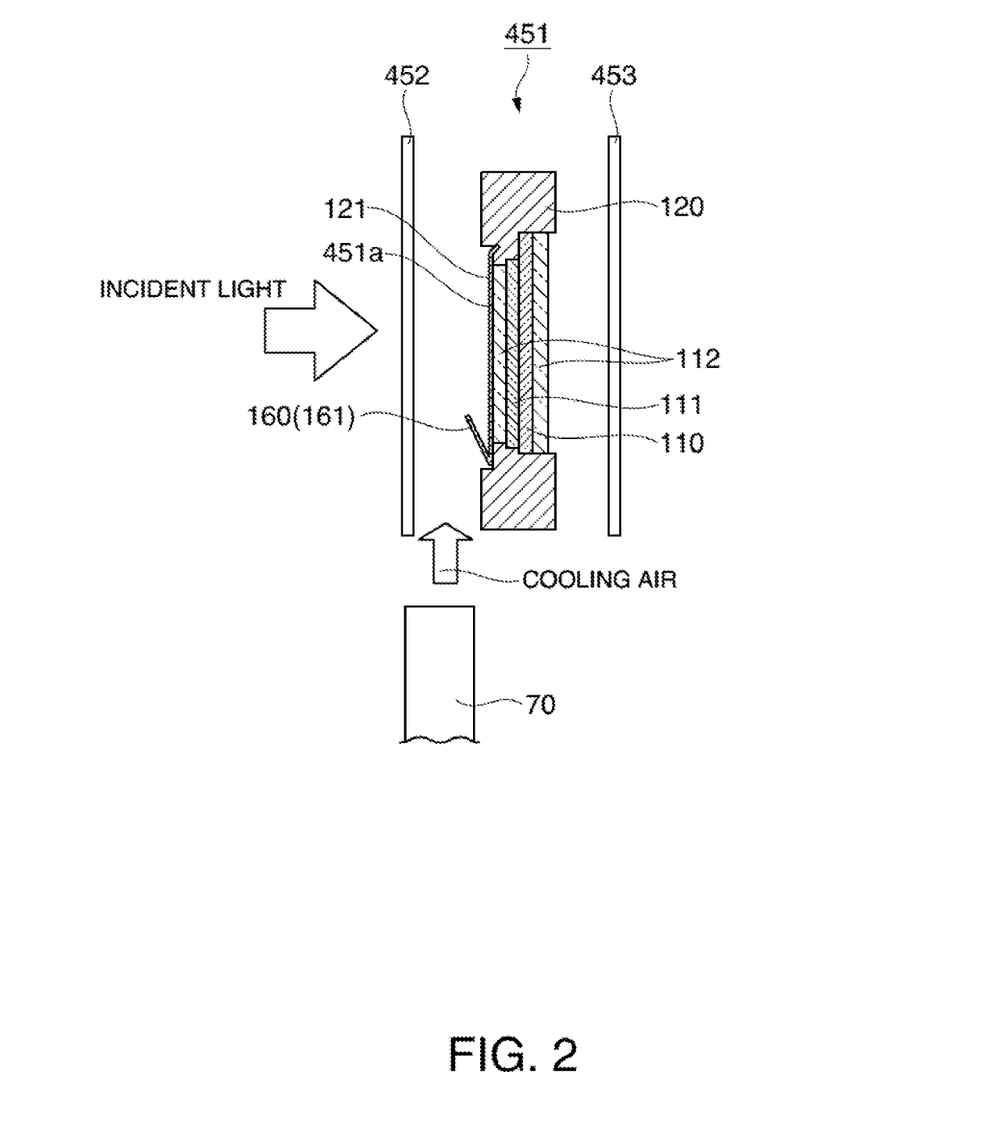
FIG. 2 shows a schematic configuration of a liquid crystal light valve and components therearound according to the first embodiment.

To efficiently cool the liquid crystal light valves 451, it is necessary to adequately supply light incident surfaces 451a of the liquid crystal light valves 451, which are objects to be cooled, with the air supplied through the duct 70 as cooling air. FIG. 2 shows a schematic configuration of one of the liquid crystal light valves 451 and components therearound. The light incident-side polarizer 452 is typically disposed on the light incident side of the liquid crystal light valve 451 in the vicinity of the light incident surface 451a (set apart by a distance ranging from 2 to 3 mm). In this case, the cooling air supplied through the duct 70 forms a laminar flow in the space between the liquid crystal light valve 451 and the light incident-side polarizer 452, and it is difficult to efficiently cool the liquid crystal light valve 451 because the cooling air does not impinge on the light incident surface 451a.

The projector 1 according to the present embodiment efficiently cools the liquid crystal light valves 451 by solving the problem described above.

Each of the liquid crystal light valves 451 according to the present embodiment encapsulates and seals a liquid crystal material, which is an electro-optic substance, between a TFT substrate 110 and a counter substrate 111, as shown in FIG. 2. The TFT substrate 110 has pixel electrodes (not shown) formed thereon in correspondence with a plurality of pixels. The TFT substrate 110 also has TFT devices formed thereon as switching devices for driving the pixel electrodes. The counter substrate 111 has counter electrodes formed thereon that apply voltages across the liquid crystal material between the pixel electrodes and the counter electrodes.

Each of the liquid crystal light valves 451 according to the present embodiment further includes dustproof glass plates 112 formed of a pair of transparent glass substrates that sandwich the TFT substrate 110 and the counter substrate 111. The dustproof glass plates 112 prevent dust, dirt, and other foreign objects from adhering to the surfaces of the TFT substrate 110 and the counter substrate 111.

Each of the liquid crystal light valves 451 is attached to a frame member 120. The frame member 120 is fixed to the cross dichroic prism 454 and integrates the liquid crystal light valve 451 with the cross dichroic prism 454. The cross dichroic prism 454 is fixed to the optical part enclosure 46 (see FIG. 1) via a fixing part (not shown). The liquid crystal light valves 451 are thus securely attached to the optical part enclosure 46 (projector 1).

A light blocking plate 121 is attached to the light incident side of each of the frame members 120 and reflects part of the light incident from the light source unit 41, that is, unwanted light incident on an area outside an effective area of the corresponding liquid crystal light valve 451, to reduce the amount of heat generated in the liquid crystal light valve 451. The light blocking plate 121 is made of SUS or any other material having high reflectance.

The projector 1 according to the present embodiment further includes a turbulent flow plate 160 somewhere in a path along which the cooling air supplied through the duct 70 travels toward the light incident surface 451a of each of the liquid crystal light valves 451. Specifically, the turbulent flow plate 160 is formed of part of each of the light blocking plates 121. Integrating the turbulent flow plate 160 and the light blocking plate 121 with each other reduces not only the number of parts that form the projector 1 but also the manufacturing cost. The turbulent flow plate 160 may alternatively be formed of a member separate from the light blocking plate 121 or may alternatively be attached to the light blocking plate 121 with screws or any other fasteners.

Figure 3:
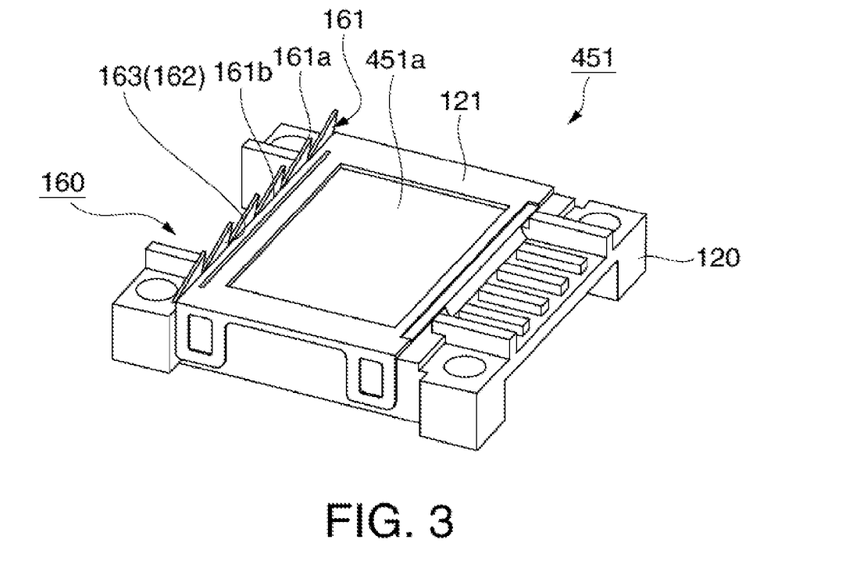
FIG. 3 is a perspective view of the configuration of the liquid crystal light valve and components therearound according to the first embodiment.
Figure 4:
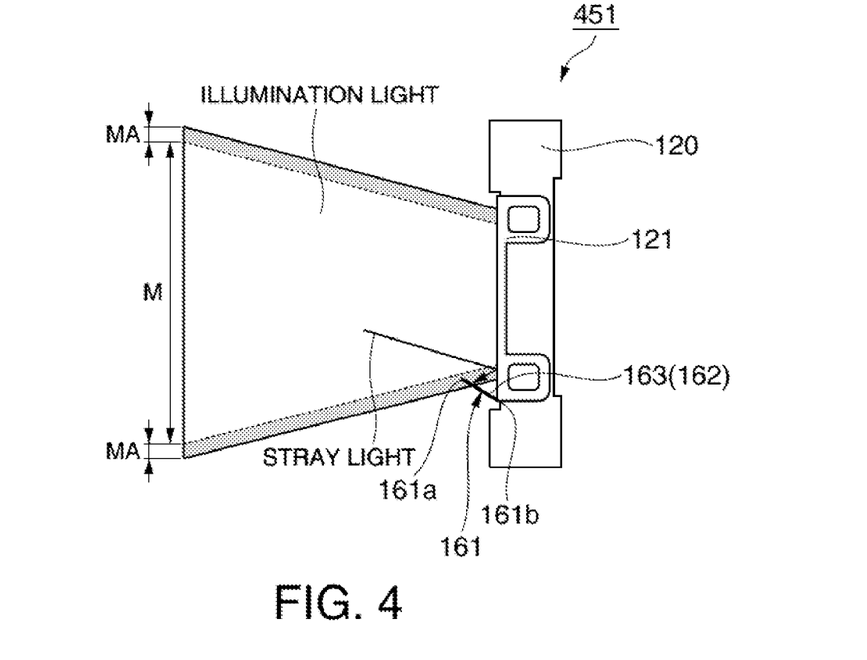
FIG. 4 describes illumination light incident on the liquid crystal light valve according to the first embodiment.

FIG. 3 is a perspective view showing the configuration of one of the liquid crystal light valves 451 and components therearound. FIG. 4 describes illumination light incident on one of the liquid crystal light valves 451. In FIGS. 3 and 4, the light incident-side polarizer 452 is omitted for clarity of illustration.

The turbulent flow plate 160 has a plurality of fins 161 disposed along a direction perpendicular to (intersecting) the direction in which the cooling air flows, as shown in FIGS. 2 and 3.

Each of the fins 161 has a shape that tapers from a base end 161b toward a tip 161a. Specifically, the shape is an isosceles triangle in the present embodiment. The turbulent flow plate 160 is so configured that the base end 161b of each of the fins 161 is located on the side where the light incident surface 451a of the liquid crystal light valve 451 is present. The turbulent flow plate 160 is further configured such that the tip 161a of each of the fins 161 is inclined to the direction in which the cooling air flows and oriented to the leeward of the cooling air. That is, since the tip 161a of each of the fins 161 is set apart from the light incident surface 451a of the liquid crystal light valve 451, a turbulent flow accompanied by vortices is produced when the cooling air flows through the plurality of fins 161, whereby the cooling air impinges on the liquid crystal light valve 451 and efficiently cools the light incident surface 451a.

Light incident on each of the liquid crystal light valves 451 via the corresponding field lens 701 and light incident-side polarizer 452 typically forms a predetermined area M that falls within a predetermined range of the light incident surface 451a of the liquid crystal light valve 451, and a margin area MA is also provided in consideration of variation and other factors of the relevant members, as shown in FIG. 4. The light is therefore incident on the entire light incident surface 451a even when the relevant members vary as described above.

The turbulent flow plate 160 according to the present embodiment is disposed such that the tip 161a of each of the fins 161 blocks light corresponding to part of the margin area MA. The configuration described above allows the light to be reliably incident on the entire light incident surface 451a and reduces the amount of light that is incident on the frame member 120, the light blocking plate 121, and other areas around the light incident surface 451a of the liquid crystal light valve 451 and converted into heat. The amount of heat generated in the liquid crystal light valve 451 can thus be reduced.

Providing the turbulent flow plate 160 therefore improves the cooling efficiency and blocks unwanted light incident on the liquid crystal light valve 451, whereby an increase in temperature of the liquid crystal light valve 451 can be suppressed.

Further, each of the fins 161 has a light absorbing film 162 formed on a surface 163 opposed to the light incident surface 451a of the liquid crystal light valve 451. The light absorbing film 162 is formed of a film made of a material having reflectance lower than that of the material of which the fins 161 are made and is, for example, made in a trivalent zinc plating process.

According to the above configuration, in which the light absorbing film 162 is provided on each of the fins 161 as described above, even when stray light reflected off the light blocking plate 121 or the pixel electrodes of the liquid crystal light valve 451 is incident on the surfaces 163 of the fins 161, the stray light will not be reflected again off the surfaces 163 of the fins 161 or incident on the light incident surface 451a at a predetermined angle or greater, whereby disadvantageous light leakage that causes malfunction of the TFT devices will not occur.

How the turbulent flow plate 160 according to the present embodiment works will now be described. The cooling air supplied through the duct 70, when it passes through the fins 161 of the turbulent flow plate 160, is divided into cooling air passing through the fins 161 and cooling air blocked by the fins 161, and the two types of cooling air merge again after flowing along the side surface of each of the fins 161, producing an atmospheric difference in the vicinity of each of the fins 161. A turbulent flow is thus produced.

The cooling air passed through the fins 161 is directed toward the light incident-side polarizer 452 disposed in the vicinity of the light incident surface 451a and then impinges on the light incident surface 451a because the cooling air is attracted toward the light incident surface 451a where the pressure is relatively low. The cooling air can thus adequately cool the light incident surface 451a. Further, the fins 161 are positioned such that the tips 161a thereof are located between the light incident surface 451a and the light incident-side polarizer 452 but shifted from the center of the space therebetween toward the light incident-side polarizer 452. The configuration allows the cooling air passing through the fins 161 to form a turbulent flow.

Figure 5:
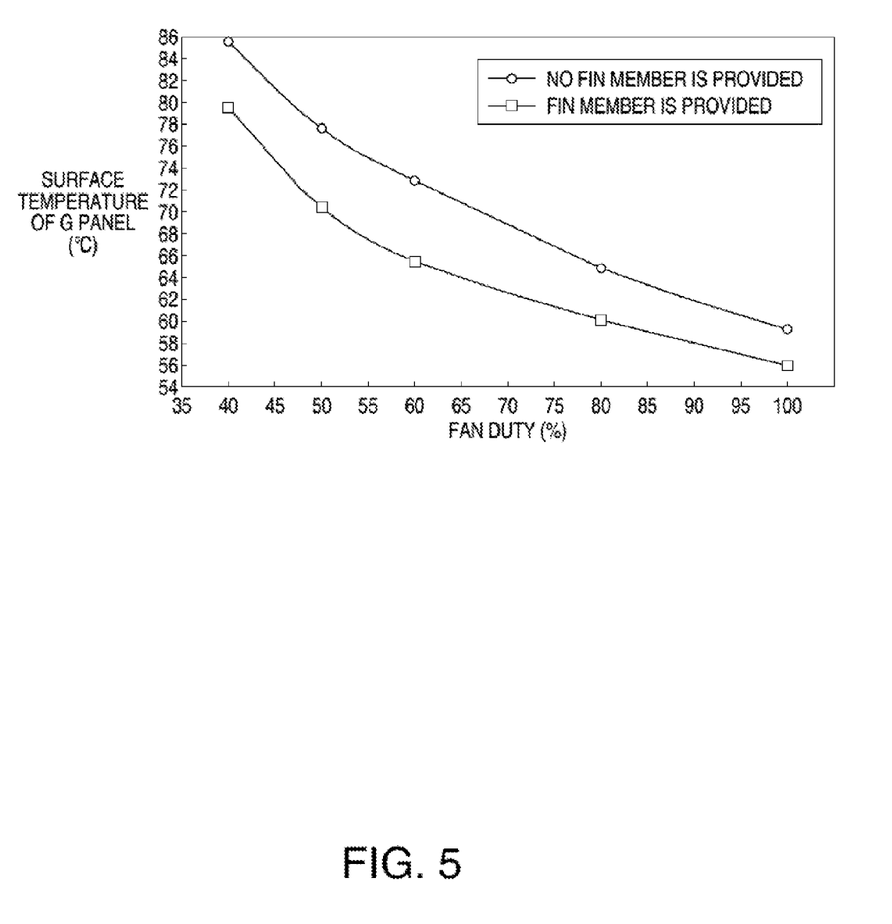
FIG. 5 describes an effect produced by providing a turbulent flow plate.

FIG. 5 shows experimental data illustrating the cooling effect produced by providing the turbulent flow plate 160. The graphs in FIG. 5 represent the temperature of the light incident surface 451a of one of the liquid crystal light valves 451 versus the output of the fan 50 in the cooling unit 5 in the projector 1 according to the present embodiment. In the graphs shown in FIG. 5, the plotted circles represent a case where no turbulent flow plate 160 is provided, and the plotted rectangles represent a case where the turbulent flow plate 160 according to the present embodiment is provided. The horizontal axis of FIG. 5 represents Fan Duty (unit: %), which represents a drive rate at which the fan 50 in the cooling unit 5 is driven. For example, a large Fan Duty means that the output of the fan 50 increases and the amount of cooling air increases accordingly.

FIG. 5 demonstrates that the surface temperature of the light incident surface 451a of each of the liquid crystal light valves 451 decreases by a greater amount in the case where the turbulent flow plate 160 is provided than the case where no turbulent flow plate 160 is provided. That is, it is ascertained that providing the turbulent flow plate 160 allows the light incident surface 451a of each of the liquid crystal light valves 451 to be efficiently cooled.

As described above, according to the projector 1 of the present embodiment, the fins 161, each of which has a shape that tapers from the base end 161b toward the tip 161a, can produce a turbulent flow in the cooling air supplied to the light incident surface 451a of each of the liquid crystal light valves 451, whereby the liquid crystal light valves 451 can be efficiently cooled. Since the cooling efficiency is therefore improved, the liquid crystal light valves 451 will not be degraded by heat. Further, since the output of the fan 50 in the cooling unit 5 can be lowered, Fan Duty of the cooling unit 5 (fan 50) can be suppressed and the amount of noise can be reduced. Further, since the cooling efficiency is high, it is not necessary to consider the heat conductivity of each of the substrates that form each of the liquid crystal light valves 451, whereby a high-cost material, such as a sapphire substrate, can be replaced with a low-cost material, such as a quartz substrate, resulting in a wider selection of materials and a lower cost of the projector 1.

Further, since each of the turbulent flow plates 160 has a plurality of fins 161 disposed along a direction perpendicular to (intersecting) the direction in which the cooling air flows, the entire light incident surface 451a of the corresponding liquid crystal light valves 451 can be efficiently cooled.

Second Embodiment

A second embodiment of the invention will subsequently be described. The present embodiment is substantially the same as the first embodiment and only differs therefrom in terms of the inclination direction of the fins 161 of each of the turbulent flow plates 160. In the following description, the same configurations and members as those in the embodiment described above have the same reference characters, and detailed descriptions thereof will be omitted or simplified.

Figure 6:
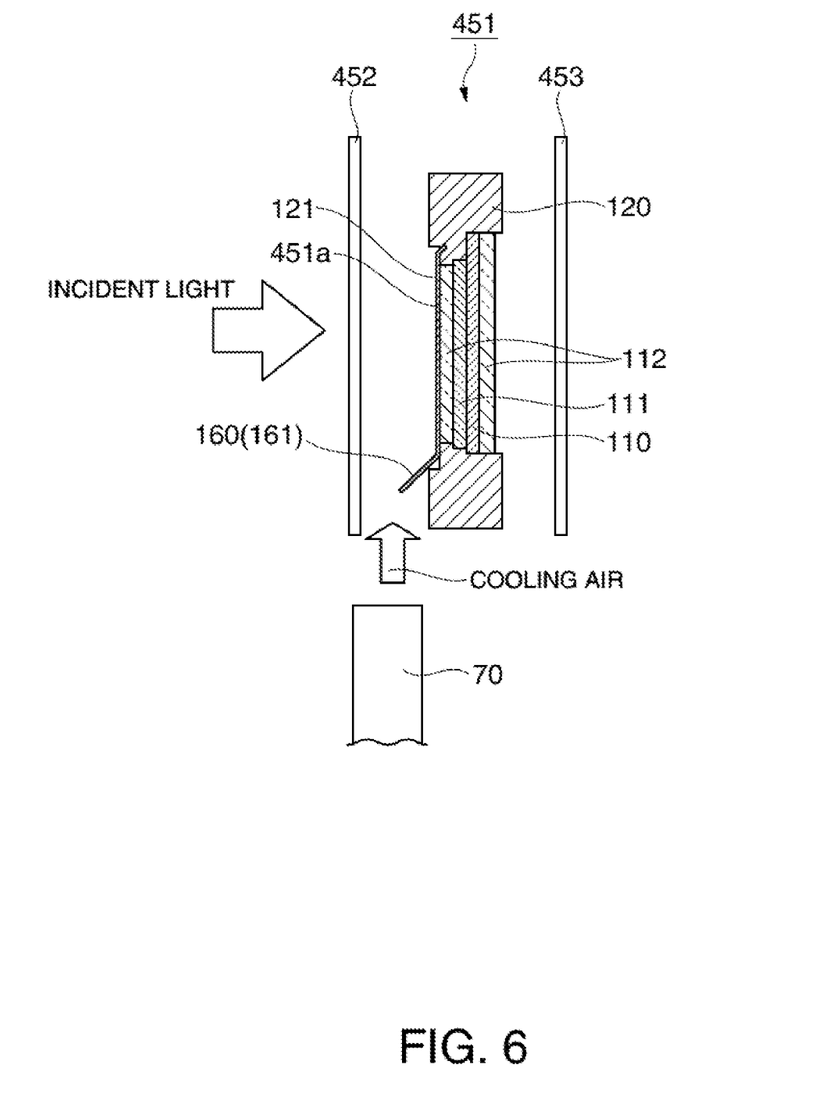
FIG. 6 shows a schematic configuration of a liquid crystal light valve and components therearound according to a second embodiment.
Figure 7:
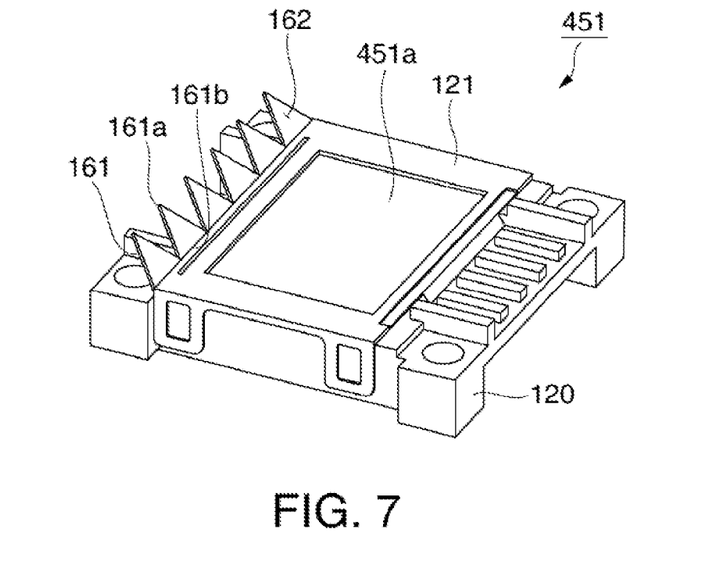
FIG. 7 is a perspective view of the configuration of the liquid crystal light valve and components therearound according to the second embodiment.

FIG. 6 shows a schematic configuration of one of the liquid crystal light valves 451 and components therearound in the present embodiment, and FIG. 7 is a perspective view of the configuration of the liquid crystal light valve 451 and components therearound. In FIG. 7, the light incident-side polarizer 452 is omitted for clarity of illustration.

A turbulent flow plate 160 according to the present embodiment is configured such that a tip 161a of each fin 161 is inclined to the direction in which the cooling air flows and oriented to the windward of the cooling air as shown in FIGS. 6 and 7.

When the fins 161 are inclined to the direction in which the cooling air flows and the tips 161a of the fins 161 are oriented to the windward of the cooling air, an experiment conducted by the present inventor shows that a turbulent flow formed when the cooling air passes through the fins 161 produces larger vortices than in the first embodiment, in which the tips 161a are oriented to the leeward of the cooling air. According to the present embodiment, the cooling efficiency at which the cooling air cools the liquid crystal light valves 451 can be improved as compared with the projector 1 according to the first embodiment.

Further, each of the fins 161 has a light absorbing film 162 provided on a surface 164 of same side as the light incident surface 451a of the liquid crystal light valve 451 (surface opposed to the side where light from light source unit 41 is incident). The light absorbing film 162 is formed of a film made of a material having reflectance lower than that of the material of which the fins 161 are made and is, for example, made in a trivalent zinc plating process, as in the first embodiment.

Figure 8:
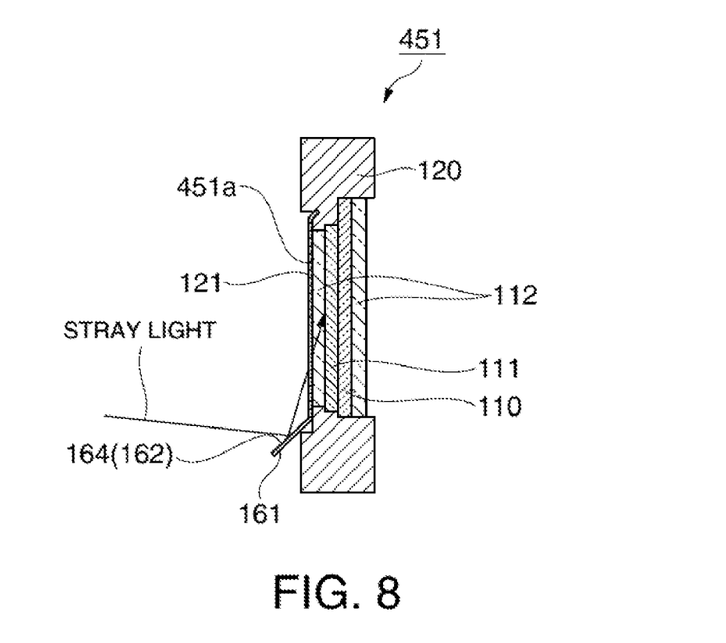
FIG. 8 describes an effect of fins according to the second embodiment.

In the above configuration, in which the light absorbing film 162 is provided on each of the fins 161 as described above, even when stray light resulting from variation in relevant members or light from the margin area is incident on the fins 161 of the turbulent flow plate 160, light will not be reflected off the surfaces 164 of the fins 161 or incident on the light incident surface 451a at a predetermined angle or greater as shown in FIG. 8, whereby disadvantageous light leakage that causes malfunction of the TFT devices will not occur.

As described above, according to the projector 1 of the present embodiment, the liquid crystal light valves 451 can be more efficiently cooled because the fins 161, each of which has a shape that tapers from the base end 161b toward the tip 161a, produce a turbulent flow containing large vortices in the cooling air. The following advantages can therefore be achieved as in the first embodiment: no degradation of the liquid crystal light valves 451; reduction in the noise produced by the cooling unit 5 (fan 50); and cost reduction.

The invention is not limited to the embodiments described above, but any change can be made as appropriate to the extent that the change does not depart from the substance of the invention.

For example, in the embodiments described above, each of the turbulent flow plates 160 is provided with the fins 161, each of which has a substantially triangular shape, by way of example, but the turbulent flow plate 160 is not necessarily shaped this way. The shape of each of the fins 161 is an isosceles triangle by way of example in the above embodiments, but the shape can, for example, be an equilateral triangle, a right-angled triangle, or any other triangular shape, or a variety of non-triangular shapes that taper from the base end 161b toward the tip 161a.

Further, the above embodiments have been described with reference to the case where each of the turbulent flow plates 160 has a plurality of (six) fins 161, but the number of fins 161 is not limited thereto. The number of fins 161 may be only one as long as the single fin 161 can adequately guide the cooling air to the light incident surface 451a of the corresponding liquid crystal light valve 451.

Further, the above embodiments have been described with reference to the case where the cooling air is supplied through the duct 70 to the liquid crystal light valves 451 by driving the single fan 50, but each of the liquid crystal light valves 451 may alternatively be provided with a duct 70, and each of the ducts 70 may be provided with a small fan.

Further, the above embodiments have been described with reference to the case where the cooling air is supplied through the duct 70 to the space between the light incident surface 451a of each of the liquid crystal light valves 451 and the corresponding light incident-side polarizer 452, but the invention is also applicable to a configuration in which each of the light incident-side polarizers 452 is replaced with a wave plate and the cooling air is efficiently supplied to the space between the wave plate and the light incident surface 451a of each of the liquid crystal light valves 451.

The entire disclosure of Japanese Patent Application No. 2011-267927, filed Dec. 7, 2011 is expressly incorporated by reference herein.

What is claimed is:

1. A projector comprising:
a light source unit;
a light modulator that modulates light exited from the light source unit;
a polarizer or a wave plate provided on a light incident side of the light modulator;
a cooling unit that supplies cooling air to the light incident side of the light modulator; and
a turbulent flow plate disposed between the light modulator and the polarizer or the wave plate in a path along which the cooling air from the cooling unit flows toward a light incident surface of the light modulator, the turbulent flow plate having a fin having a shape that tapers from a base end toward a tip,
wherein the turbulent flow plate is disposed such that at least part of the fin is shifted to the windward of the cooling air from the light incident surface of the light modulator.

2. The projector according to claim 1,
wherein the turbulent flow plate is disposed on the light incident side of the light modulator such that the base end of the fin is disposed on the light incident side of the light modulator.

3. The projector according to claim 1,
wherein a light blocking plate is provided on the light incident side of the light modulator, and
part of the light blocking plate forms the turbulent flow plate.

4. The projector according to claim 1
wherein the fin is located in a plurality of positions along the turbulent flow plate, and
the plurality of fins are disposed along a direction perpendicular to the direction in which the cooling air flows toward the light incident side.

5. The projector according to claim 1,
wherein the turbulent flow plate is configured such that the tip of the fin is inclined to a direction in which the cooling air flows.

6. The projector according to claim 5,
wherein the turbulent flow plate is configured such that the tip of the fin is oriented to a windward of the cooling air.

7. The projector according to claim 6,
wherein the fin has a light absorbing film on a surface to which the light from the light source unit is incident.

8. The projector according to claim 5,
wherein the turbulent flow plate is configured such that the tip of the fin is oriented to a leeward of the cooling air.

9. The projector according to claim 8,
wherein the fin has a light absorbing film on a surface opposed to the light incident surface of the light modulator.

10. The projector according to claim 8,
wherein the light modulator has an effective area where light incident thereon can be modulated, and
the fin is disposed in a position where the fin blocks part of the light incident on an area outside the effective area of the light modulator.

11. A projector comprising:
a light source unit;
a light modulator that modulates light exited from the light source unit;
a polarizer or a wave plate provided on a light incident side of the light modulator;
a cooling unit that supplies cooling air to the light incident side of the light modulator; and
a turbulent flow plate disposed between the light modulator and the polarizer or the wave plate in a path along which the cooling air from the cooling unit flows toward a light incident surface of the light modulator, the turbulent flow plate having a fin having a shape that tapers from a base end toward a tip, wherein the turbulent flow plate is disposed such that the tip of the fin is positioned between the light incident surface of the light modulator and the polarizer or the wave plate and shifted from a center of space therebetween toward the polarizer or the wave plate.

* * * * *